(12) United States Patent
Wang

(10) Patent No.: US 11,315,423 B2
(45) Date of Patent: Apr. 26, 2022

(54) SYSTEM FOR MONITORING TANK TRUCK OPERATION PLATFORM AND FOR GUIDING AND POSITIONING VEHICLE AND METHOD FOR USING THE SAME

(71) Applicant: NANJING STARTON TECHNOLOGY CO. LTD., Nanjing (CN)

(72) Inventor: Weiping Wang, Nanjing (CN)

(73) Assignee: NANJING STARTON TECHNOLOGY CO. LTD., Nanjing (CN)

( * ) Notice: Subject to any disclaimer, the term of this patent is extended or adjusted under 35 U.S.C. 154(b) by 451 days.

(21) Appl. No.: 16/482,263

(22) PCT Filed: May 25, 2018

(86) PCT No.: PCT/CN2018/088412
§ 371 (c)(1),
(2) Date: Sep. 29, 2019

(87) PCT Pub. No.: WO2018/219224
PCT Pub. Date: Dec. 6, 2018

(65) Prior Publication Data
US 2020/0013285 A1 Jan. 9, 2020

(30) Foreign Application Priority Data
Jun. 2, 2017 (CN) .......................... 201710409344.1

(51) Int. Cl.
*G08G 1/09* (2006.01)
*G08G 1/0968* (2006.01)
(Continued)

(52) U.S. Cl.
CPC ...... *G08G 1/096833* (2013.01); *B60P 1/4471* (2013.01); *B60P 3/22* (2013.01); *G08G 1/133* (2013.01)

(58) Field of Classification Search
CPC .. G08G 1/096833; G08G 1/133; G08G 1/205; B60P 1/4471; B60P 3/22; B65G 67/04
See application file for complete search history.

(56) References Cited

U.S. PATENT DOCUMENTS 5,951,226 A 9/1999 Fantuzzi
9,133,014 B2 9/2015 Kenan et al.
(Continued)

FOREIGN PATENT DOCUMENTS

CN 101718982 A 6/2010
CN 205133135 U 4/2016
(Continued)

*Primary Examiner* — Joseph H Feild
*Assistant Examiner* — Sharmin Akhter
(74) *Attorney, Agent, or Firm* — Bayramoglu Law Offices LLC

(57) ABSTRACT

A system for monitoring a tank truck operation platform and for guiding and positioning vehicles and a method of using the same, the system includes operation platforms. Each of the operation platforms is provided with a lifting support. The operation platform is installed with an upper-position sensor, a lower-position sensor, and a stress sensor, which communicate with a central control device mounted on the operation platform. The central control device communicates with a distance meter and an in-place sensor for detecting the vehicle. The central control device may send signals to a display device, and information of platform status and vehicle position guidance are displayed on the display device to offer the driver with guidance information including whether the platform is safe and available, the moving direction of the vehicle, and position relative to the (Continued)

platform. Meanwhile, the central control device can receive identification information sent by the vehicle.

10 Claims, 2 Drawing Sheets

(51) Int. Cl.
  *B60P 1/44* (2006.01)
  *B60P 3/22* (2006.01)
  *G08G 1/133* (2006.01)

(56) References Cited

U.S. PATENT DOCUMENTS

| | | | |
|---|---|---|---|
| 2010/0204833 A1 | 8/2010 | Lund | |
| 2015/0375947 A1* | 12/2015 | Hochstein | G01V 8/20 250/216 |
| 2016/0009177 A1* | 1/2016 | Brooks | B65G 69/006 340/468 |

FOREIGN PATENT DOCUMENTS

| | | |
|---|---|---|
| CN | 205133142 U | 4/2016 |
| CN | 105692232 A | 6/2016 |
| CN | 106219265 A | 12/2016 |
| CN | 205855412 U | 1/2017 |
| CN | 106744623 A | 5/2017 |
| CN | 107134128 A | 9/2017 |
| DE | 19628123 A1 | 1/1998 |
| EP | 2514690 A1 | 10/2012 |
| JP | 2012236666 A | 12/2012 |

* cited by examiner

SYSTEM FOR MONITORING TANK TRUCK OPERATION PLATFORM AND FOR GUIDING AND POSITIONING VEHICLE AND METHOD FOR USING THE SAME

CROSS REFERENCE TO RELATED APPLICATIONS

This application is the national phase entry of International Application PCT/CN2018/088412, filed on May 25, 2018 which is based upon and claims priority to Chinese Patent Application No. 201710409344.1, filed on Jun. 2, 2017 the entire contents of which are incorporated herein by reference.

TECHNICAL FIELD

The present disclosure relates to the technical field of loading/unloading control system for tank trucks, particularly to a system for monitoring a tank truck operation platform and for guiding and positioning vehicles and a method for using the same.

BACKGROUND

A tank truck is a transport vehicle for carrying and transporting cement powder, petroleum, or other substances. The vent for filling or draining the material is located at the top of the tank truck. The commonly seen tank truck is cement truck, etc. Loading of the tank truck requires a driver to position the tank truck at a loading spot. The filling port of the tank truck faces toward a feeding tube, and the system controls the drop tube to fill the material into the tank truck, thus the tank truck should always be properly positioned at the right spot. During practical operations, before the tank truck is moved to the loading spot, the driver first needs to open a tank cover of the tank truck. After the loading is finished, the tank truck is moved out of the loading spot, and the driver needs to close the tank cover. Sometimes, the driver may accidentally fall down and get hurt while climbing the tank truck. To get rid of the potential risks, operation rack platform is provided at the front and back sides of the loading equipment in some of the loading areas. The driver needs to move the tank truck to a proper position under the rack platform, and then climbs up to the operation platform to open the tank cover of the tank truck. By doing so, the risk of the driver climbing the tank truck can be avoided. According to the loading and unloading processes followed in the area, the tank truck is involved in three times of moving and positioning. The driver is required to position the tank truck at the proper spot, otherwise the driver would not be able to fill the material into the tank truck as the tank cover is at a distance from the loading port. Moreover, the driver would fail to open or close the tank cover of the tank truck on the operation platform if the tank truck is not positioned at a proper spot under the operation platform. Practically, the vehicle usually needs to be moved multiple times to get the right position. Another problem lies in the interaction between the vehicle and the loading equipment or the lifting platform. When the loading port or the lifting platform is at a low position, a collision may occur when the vehicle is trying to get into the loading spot, or the loading equipment or the platform may get pulled when the vehicle is trying to get out, which results in severe safety hazards. The most dangerous thing is that sometimes the tank truck doesn't make an obvious change to the loading equipment or the operation platform, but just loosen the fixation of the loading equipment or the lifting platform, and the working personnel cannot tell any difference from the appearance. Once the operations are conducted for the subsequent vehicle, an accident takes place.

Technical Problem

The present disclosure provides a system for monitoring a tank truck operation platform and for guiding and positioning vehicles and a method of using the same, which can detect an entry position of the tank truck, detect a status of the operation platform, and has a guidance function.

Technical Solution

The present disclosure employs the following technical solutions.

A system for monitoring a tank truck operation platform and for guiding and positioning vehicles includes a plurality of operation platforms, wherein tank trucks are positioned at the operation platforms, and each of the operation platforms is provided with a lifting support. Each of the operation platforms is provided with a central control device, the operation platform is installed with a distance meter, a vehicle in-place sensor, an upper-position sensor, and a lower-position sensor. The distance meter is used to measure a distance between the tank truck entering the tank truck operation platform and the lifting support. The vehicle in-place sensor is used to detect a lengthwise position of the tank truck entering the operation platform. The upper-position sensor is installed at an upper movement limit of the lifting support, and the lower-position sensor is installed at a lower movement limit of the lifting support. The upper-position sensor and the lower-position sensor are used to detect whether the lifting support is lifted or lowered to a predetermined position. The lifting support is installed with a stress sensor, and the stress sensor is installed at a force bearing joint of the lifting support and the operation platform to detect a stress condition of the lifting support. The distance meter, the upper-position sensor, the lower-position sensor, the stress sensor, and the vehicle in-place sensor all communicate with the central control device through signals. The central control device can communicate with an external display device, and the display device is used to display information sent out by the central control device to offer a driver with guidance information including whether the operation platform is available, a moving direction of the vehicle, and a position relative to the operation platform.

To optimize the above technical solution, the following specific measures are taken.

The central control device can communicate with a remote server and send detection signals of the distance meter, the upper-position sensor, the lower-position sensor, the stress sensor, and an external monitor to the remote server. The remote server analyzes data and makes judgements, and the remote server can send instructions to the central control device and the display device for controlling the system and displaying.

The operation platforms are located on a loading/unloading area, the loading/unloading area includes an entrance and a loading path. The operation platform is located on the loading path. The entrance is provided with a monitor. The monitor communicates with the tank truck entering and exiting the entrance to obtain identification information of the vehicle, monitor an operation status and a position of the vehicle, and send signals to the central control device.

The display device may be a display terminal installed in a tank truck cab or an external large screen display.

The display terminal may be a cellphone or an on-vehicle display.

The display device may be the large screen display mounted beside the operation platforms.

An end of the lifting support is connected to the operation platform, and the other end of the lifting support is connected to an operation terminal. The operation terminal is provided with a vibration sensor. The vibration sensor is used to detect vibration of the operation terminal, and the vibration sensor communicates with the central control device.

The central control device is installed inside a controller housing, and the controller housing is installed on the tank truck platform. The remote server is provided with a memory, and the memory is used to store the information received by the central control device.

A method of using the system for monitoring the tank truck operation platform and for guiding and positioning the vehicle includes the following steps:

step 1, entering the tank truck from the entrance, monitoring the tank truck by the monitor, establishing a communication between the monitor and the tank truck to measure the position information of the tank truck, and sending data to the central control device;

step 2, detecting, by the central control device, the working status of the operation platform and sending the status information to the display device; wherein at this stage the lifting support is supposed to be lifted to the upper movement limit, if the lifting support is not at the upper movement limit, the display device issues an alarm to stop the tank truck from entering the operation platform, and if the lifting support is at the upper movement limit, go to step 3;

step 3, measuring, by the distance meter, the distance between a tank truck body and the operation platform when the tank truck is approaching the operation platform, and sending, by the central control device, the distance information to the display device, wherein if a distance deviation is larger than a predetermined value, the display device issues a corresponding alarm to remind the driver to adjust a driving direction till the vehicle is positioned at a proper position, and if the distance deviation falls within a deviation range, go to step 4;

step 4: controlling, by the tank truck driver, the lifting support to move the lifting support to the lower movement limit and lower the lifting support above the tank truck to a roof of the tank truck, and detecting, by the central control device and the stress sensor, whether a stress applied to the lifting support falls within a predetermined range, then sending out the signal; wherein if the data is abnormal, the display device issues an alarm to stop the tank truck driver to operate the lifting support, and if the data falls within the predetermined range, go to step 5;

step 5: operating, by the tank truck driver, the lifting support, and detecting, by the central control device, change information during the operation, sending out the change information by the central control device, and displaying, by the display device, a status of the lifting support; and step 6: after the operation is finished, controlling, by the tank truck driver, the lifting support to move the lifting support to the upper movement limit; detecting, by the central control device, the status of the lifting support, and displaying information of whether the lifting support is normal, wherein if the lifting support is at a normal status, a prompt is displayed to allow leaving, and the driver drives the tank truck to leave the operation platform.

The information sent out by the central control device is not only received and displayed by the display device, but also received by the server for recording and monitoring. The server administrator can conduct remote control by observing the situations.

The present disclosure further includes a step for alarming according to the vibration of the operation platform: when the tank truck driver left the lifting support and forgot to lift the lifting support, a collision between the operation platform and the tank truck occurs when the tank truck starts to move, causing a vibration in the operation platform. Then, the vibration sensor sends a signal to the central control device, the central control device sends the signal to a signal receiver, and the display device issues an alarm.

The system for monitoring the tank truck operation platform and for guiding and positioning the vehicle is mainly applied to the tank truck loading/unloading area and can be used to monitor the loading and unloading of the tank truck. The system for monitoring the tank truck operation platform and for guiding and positioning the vehicle can also be applied in some other cases where the monitoring and guidance of tank truck is required, such as inspection and maintenance of the tank truck, etc. The system for monitoring the tank truck operation platform and for guiding and positioning the vehicle detects the status of the tank truck and the operation platform through the distance meter, the upper-position sensor, the lower-position sensor, the stress sensor, the vibration sensor, and the like and offers information to the driver through the display device to ensure safety of the driver. The distance meter can detect an entrance position of the tank truck, offer guidance information to the driver, and issue an alarm when the tank truck is not positioned at the proper spot. The upper-position sensor and the lower-position sensor can be used to detect the position of the lifting support to offer the position information of the lifting support to the driver and help the driver to know the status of the operation platform. The stress sensor can detect whether the connection between the lifting support and the operation platform is stable or not to prevent an accident caused by the loosening of the lifting support. The vibration sensor can detect the vibration of the operation platform and issue the alarm to prompt the driver of the accident when the collision between the tank truck and the operation platform occurs. At the same time, all of the operation platforms in the area, the in-place situations of the tank truck, and the operation situations of the lifting support are recorded and remotely managed through the server, so as to improve the working safety and efficiency.

Figure 1:
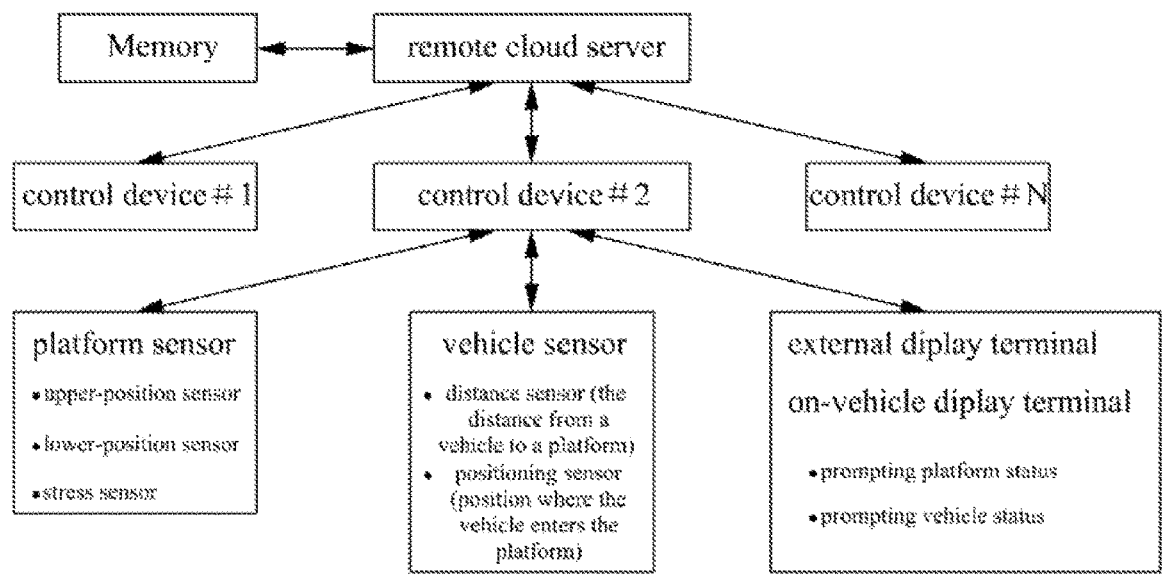
FIG. 1 is a block diagram of the present disclosure.
Figure 2:
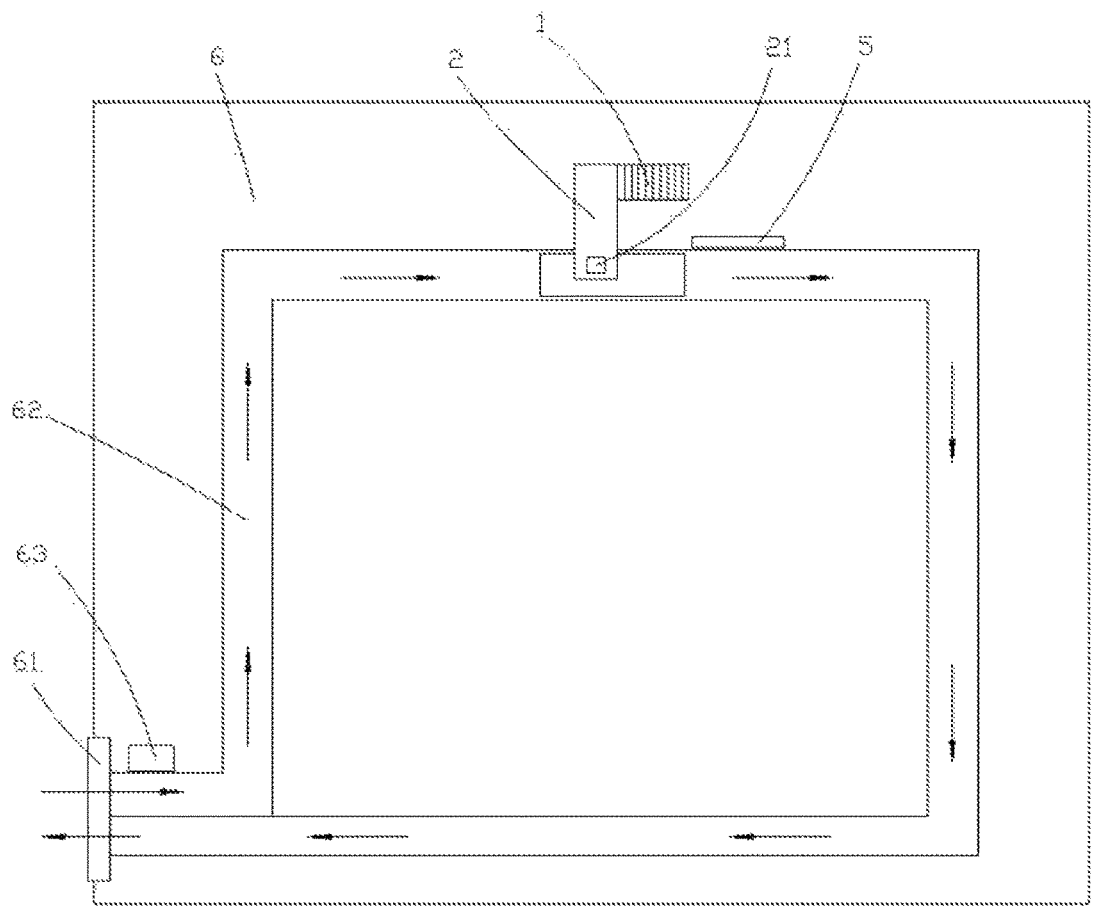
FIG. 2 is a layout of a loading area.
Figure 3:
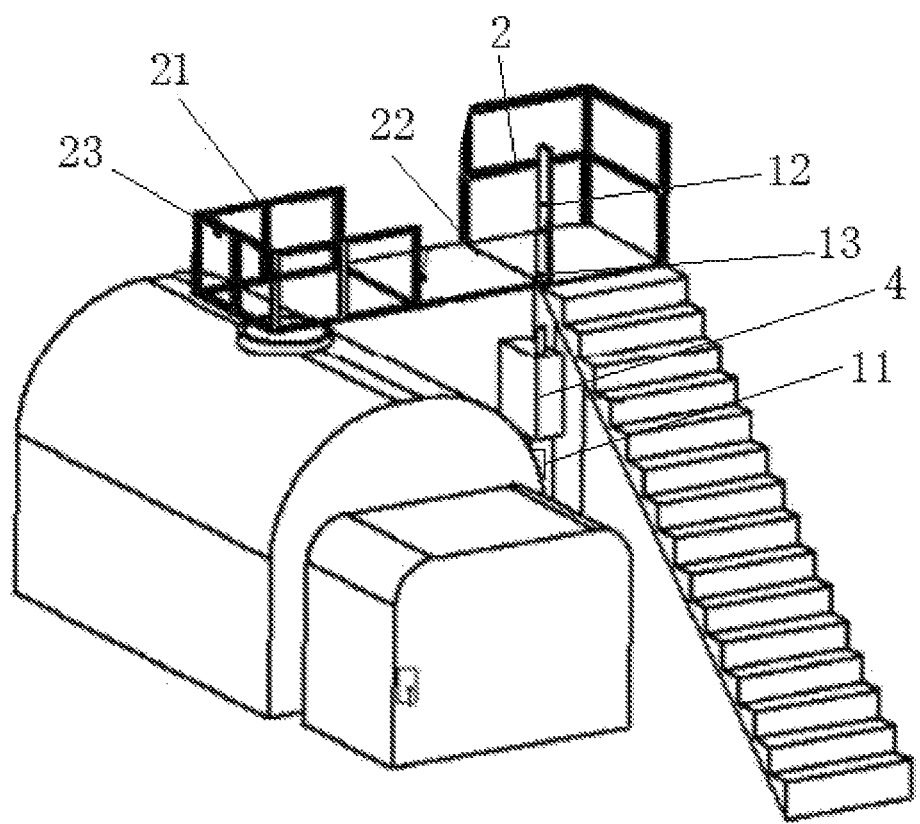
FIG. 3 is a schematic diagram showing the structures of an operation platform and a lifting support.

The reference designators in the drawings are described below: operation platform 1, distance meter 11, upper-position sensor 12, lower-position sensor 13, lifting support 2, operation terminal 21, stress sensor 22, vibration sensor 23, remote cloud server 3, central control device 4, display device 5, loading area 6, entrance 61, circular loading path 62, monitor 63.

BEST MODE OF THE PRESENT DISCLOSURE

Embodiment 1

A system for monitoring a tank truck operation platform and for guiding and positioning vehicles of the present disclosure includes a plurality of tank truck platforms 1, and tank trucks are positioned at the operation platforms 1. Each operation platform 1 is provided with the lifting support 2. Each of the tank truck platforms 1 is provided with the central control device 4, and the tank truck platform 1 is installed with the distance meter 11, the vehicle in-place sensor, the upper-position sensor 12, and the lower-position sensor 13. The distance meter 11 is used to measure a distance between the tank truck entering the operation platform 1 and the lifting support 2. The vehicle in-place sensor is used to detect a lengthwise position of the tank truck entering the operation platform. The upper-position sensor 12 is installed at an upper movement limit of the lifting support 2, and the lower-position sensor 13 is installed at a lower movement limit of the lifting support 2. The upper-position sensor 12 and the lower-position sensor 13 are used to detect whether the lifting support 2 is lifted or lowered to a predetermined position. The lifting support 2 is installed with the stress sensor 22, and the stress sensor 22 is installed at a force bearing joint of the lifting support 2 and the tank truck platform 1 to detect an interaction force between the lifting support 2 and the operation platform 1. The distance meter 11, the upper-position sensor 12, the lower-position sensor 13, the stress sensor 22, and the vehicle in-place sensor all communicate with the central control device 4 through signals. The central control device 4 communicates with the display device 5 through signals, and the display device 5 is used to display information received by the central control device 4 to offer the driver with guidance information including whether the operation platform 1 is available, a moving direction of the vehicle, and a position relative to the operation platform.

According to one embodiment, the central control devices 4 all communicate with the remote cloud server 3 through signals. The signals of the distance meter 11, the upper-position sensor 12, the lower-position sensor 13, the stress sensor 22, and an external monitor are all sent to the remote cloud server 3 through the central control device 4. The remote cloud server 3 analyzes the data and conducts judgements, and the remote cloud server 3 can send the analyzed and judged data to the display device 5 through the central control device 4.

According to one embodiment, the operation platform 1 is located on the loading area 6. The loading area 6 includes the entrance 61 and the circular loading path 62. The operation platform 1 is located on the circular loading path 62. The entrance 61 is installed with the monitor 63. The monitor 63 can communicate with the tank truck entering or exiting the entrance 61 through signals, obtain vehicle identification information, monitor operation status and position of the tank truck, and send the signals to the central control device 4.

According to one embodiment, the display device 5 is a signal receiver and display with a display screen and is mounted in the tank truck cab.

According to one embodiment, the display terminal is a cellphone.

According to one embodiment, an end of the lifting support 2 is connected to the operation platform 1 for lifting purpose, and the other end of the lifting support 2 is connected to the operation terminal 21. The operation terminal 21 is provided with the vibration sensor 23. The vibration sensor 23 is used to detect the vibration of the operation terminal 21. The vibration sensor 23 communicates with the central control device 4.

According to one embodiment, the central control device 4 is provided inside a controller housing. The controller housing is installed on the tank truck platform 1. The remote cloud server 3 is provided with a memory. The memory is used to store the information that is received by the central control device 4.

A method of using the system for monitoring the tank truck operation platform and for guiding and positioning the vehicle includes the following steps.

Step 1, the tank truck enters the loading area from the entrance, after the monitor 63 detects the tank truck, the monitor 63 establishes communication with the on-vehicle display, measures the position information of the tank truck, and sends the data to the central control device 4.

Step 2, when the tank truck is approaching the tank truck platform 1, the central control device 4 establishes communication with the signal receiver mounted on the tank truck through signals. In the meantime, the lifting support 2 is supposed to locate at the upper movement limit. If the lifting support 2 is not at the upper movement limit, the central control device 4 sends signals to the signal receiver, and the display device 5 issues an alarm to stop the tank truck from entering the operation platform 1. If the lifting support 2 is at the upper movement limit, go to step 3.

Step 3, after the tank truck is positioned at the operation platform 1, the distance meter 11 measures the distance from the tank truck body to the operation platform 1. If the distance deviation is larger than a predetermined value, the central control device 4 sends the signal to the signal receiver, and the display device 5 issues an alarm to remind the driver to move the vehicle to a proper position. If the distance deviation is not larger than the predetermined value, go to step 4.

Step 4: the tank truck driver controls the lifting support 2 to move to the lower movement limit, so that the lifting support above the tank truck is lowered onto the roof of the tank truck. The stress sensor 22 detects the acting force between the lifting support 2 and the operation platform, if the value of the acting force does not fall within a predetermined value range, it indicates that the lifting support 2 and the operation platform are in a poor connection. The central control device 4 sends the signal to the signal receiver, the display device 5 issues an alarm to prevent the tank truck driver from walking onto the lifting support 2. If the value of the acting force falls within the predetermined value range, go to step 5.

Step 5: the tank truck driver walks onto the lifting support 2 and conducts the operations on the tank of the tank truck on the operation terminal 21.

Step 6: after the operations are finished, the tank truck driver leaves the lifting support 2, controls the lifting support 2 to move to the upper movement limit, and drives the tank truck to leave the tank truck platform 1.

The method may further include a step of alarming according to the vibrations of the operation terminal 21: when the tank truck driver left the lifting support 2 forgetting to lift the lifting support 2, a collision between the tank truck and the operation terminal 21 occurs when the tank truck is moved. As a result, the operation terminal 21 may vibrate, the vibration sensor 23 sends the signal to the central control device 4, the central control device 4 sends the signal to the signal receiver, and the display device 5 issues the alarm.

DETAILED DESCRIPTION OF THE EMBODIMENTS

Embodiment 1

A system for monitoring a tank truck operation platform and for guiding and positioning vehicles of the present disclosure includes a plurality of tank truck platforms 1, and tank trucks are positioned at the operation platforms 1. Each operation platform 1 is provided with the lifting support 2. Each of the tank truck platforms 1 is provided with the central control device 4, and the tank truck platform 1 is installed with the distance meter 11, the vehicle in-place sensor, the upper-position sensor 12, and the lower-position sensor 13. The distance meter 11 is used to measure a distance between the tank truck entering the operation platform 1 and the lifting support 2. The vehicle in-place sensor is used to detect a lengthwise position of the tank truck entering the operation platform. The upper-position sensor 12 is installed at an upper movement limit of the lifting support 2, and the lower-position sensor 13 is installed at a lower movement limit of the lifting support 2. The upper-position sensor 12 and the lower-position sensor 13 are used to detect whether the lifting support 2 is lifted or lowered to a predetermined position. The lifting support 2 is installed with the stress sensor 22, and the stress sensor 22 is installed at a force bearing joint of the lifting support 2 and the tank truck platform 1 to detect an interaction force between the lifting support 2 and the operation platform 1. The distance meter 11, the upper-position sensor 12, the lower-position sensor 13, the stress sensor 22, and the vehicle in-place sensor all communicate with the central control device 4 through signals. The central control device 4 communicates with the display device 5 through signals, and the display device 5 is used to display information received by the central control device 4 to offer the driver with guidance information including whether the operation platform 1 is available, a moving direction of the vehicle, and a position relative to the operation platform.

According to one embodiment, the central control devices 4 all communicate with the remote cloud server 3 through signals. The signals of the distance meter 11, the upper-position sensor 12, the lower-position sensor 13, the stress sensor 22, and an external monitor are all sent to the remote cloud server 3 through the central control device 4. The remote cloud server 3 analyzes the data and conducts judgements, and the remote cloud server 3 can send the analyzed and judged data to the display device 5 through the central control device 4.

According to one embodiment, the operation platform 1 is located on the loading area 6. The loading area 6 includes the entrance 61 and the circular loading path 62. The operation platform 1 is located on the circular loading path 62. The entrance 61 is installed with the monitor 63. The monitor 63 can communicate with the tank truck entering or exiting the entrance 61 through signals, obtain vehicle identification information, monitor operation status and position of the tank truck, and send the signals to the central control device 4.

According to one embodiment, the display device 5 is a signal receiver and display with a display screen and is mounted in the tank truck cab.

According to one embodiment, the display terminal is a cellphone.

According to one embodiment, an end of the lifting support 2 is connected to the operation platform 1 for lifting purpose, and the other end of the lifting support 2 is connected to the operation terminal 21. The operation terminal 21 is provided with the vibration sensor 23. The vibration sensor 23 is used to detect the vibration of the operation terminal 21. The vibration sensor 23 communicates with the central control device 4.

According to one embodiment, the central control device 4 is provided inside a controller housing. The controller housing is installed on the tank truck platform 1. The remote cloud server 3 is provided with a memory. The memory is used to store the information that is received by the central control device 4.

A method of using the system for monitoring the tank truck operation platform and for guiding and positioning the vehicle includes the following steps.

Step 1, the tank truck enters the loading area from the entrance, after the monitor 63 detects the tank truck, the monitor 63 establishes communication with the on-vehicle display, measures the position information of the vehicle, and sends the data to the central control device 4.

Step 2, the central control device 4 establishes communication with the signal receiver mounted on the tank truck through signals. In the meantime, the lifting support 2 is supposed to locate at the upper movement limit. If the lifting support 2 is not at the upper movement limit, the central control device 4 sends signals to the signal receiver, and the display device 5 issues an alarm to stop the tank truck from entering the operation platform 1. If the lifting support 2 is at the upper movement limit, go to step 3.

Step 3, when the tank truck is approaching the operation platform 1, the distance meter 11 measures the distance from the tank truck body to the operation platform 1. If the distance deviation is larger than a predetermined value, the central control device 4 sends the signal to the signal receiver, and the display device 5 issues an alarm to remind the driver to move the vehicle to a proper position. If the distance deviation is not larger than the predetermined value, go to step 4.

Step 4: the tank truck driver controls the lifting support 2 to move to the lower movement limit, so that the lifting support above the tank truck is lowered onto the roof of the tank truck. The stress sensor 22 detects the acting force between the lifting support 2 and the operation platform, if the value of the acting force does not fall within a predetermined value range, it indicates that the lifting support 2 and the operation platform are in a poor connection. The central control device 4 sends the signal to the signal receiver, the display device 5 issues an alarm to prevent operations on the lifting support 2. If the value of the acting force falls within the predetermined value range, go to step 5.

Step 5: the tank truck driver operates the lifting support 2.

Step 6: after the operations are finished, the tank truck driver leaves the lifting support 2, controls the lifting support 2 to move to the upper movement limit, and drives the tank truck to leave the tank truck platform 1.

The method may further include a step of alarming according to the vibrations of the operation terminal 21: when the tank truck driver left the lifting support 2 forgetting to lift the lifting support 2, a collision between the tank truck and the operation terminal 21 occurs when the tank truck is moved. As a result, the operation terminal 21 vibrates, the vibration sensor 23 sends the signal to the central control device 4, the central control device 4 sends the signal to the signal receiver, and the display device 5 issues the alarm.

Embodiment 2

According to the present embodiment, the display device 5 is a large screen display mounted beside the tank truck platform 1.

The rest of the embodiment 2 is the same as the embodiment 1.

Some of the enterprises believe that providing a phone that requires real-time attention to the tank truck driver will increase the risks of accident, so the display device is provided near the tank platform 1 instead of the tank driver cab.

INDUSTRIAL APPLICABILITY

The kernel of the system of the present disclosure is the central control device 4. When the vehicle is approaching the loading position, the signal receiver is controlled through the cellphone to communicate with the central control device 4 via a wireless network and trigger the sensors. When the central control device 4 receives the sensor information, the central control device will distribute the data to the signal receiver through the wireless network. The cellphone obtains the sensor information from the signal receiver to help the driver to determine where to go next (move forth, move back, move to the left, or move to the right).

The system employs the cross-communication of multiple networks including a local area network and the wireless network to realize functions. The system is characterized by clear framework and high transmission efficiency. The communication mode can be determined according to field visits and multi-party negotiation. The upper-layer communication is based on the local area network, and the lower-layer communication is based on the wireless network (e.g. Zig-bee, Bluetooth).

What is claimed is:

1. A system for monitoring a tank truck operation platform and for guiding and positioning vehicles comprising a plurality of operation platforms, wherein tank trucks are positioned at the operation platforms, each of the operation platforms is provided with a lifting support and a central control device, each operation platform is installed with a distance meter, a vehicle in-place sensor, an upper-position sensor, and a lower-position sensor; the distance meter is used to measure a distance from a vehicle entering the operation platform to the lifting support, the in-place sensor is used to measure a lengthwise position of the vehicle entering the operation platform, the upper-position sensor is installed at an upper movement limit of the lifting support, the lower-position sensor is installed at a lower movement limit of the lifting support, and the upper-position sensor and the lower-position sensor are used to detect whether the lifting support is lifted or lowered to a predetermined position; the lifting support is provided with a stress sensor, the stress sensor is installed at a force bearing joint between the lifting support and the operation platform to detect interaction forces between the lifting support and the operation platform; the distance meter, the upper-position sensor, the lower-position sensor, the stress sensor, and the vehicle in-place sensor all communicate with the central control device through signals, the central control device communicates with a display device through signals, and the display device is used to display information received by the central control device- to offer a driver with guidance information including whether the operation platform is available, a moving direction of the vehicle, and a position of the vehicle relative to the operation platform.

2. The system for monitoring the tank truck operation platform and for guiding and positioning vehicles according to claim 1, wherein the central control devices of the plurality of operation platforms all communicate with a server through signals, signals of the distance meter, the upper-position sensor, the lower-position sensor, the stress sensor, and an external monitor are all sent to the server through a corresponding central control device, the server analyzes data and conducts judgements, and the server sends analyzed and judged data to the display device-(through the corresponding central control device.

3. The system for monitoring the tank truck operation platform and for guiding and positioning vehicles according to claim 2, wherein the operation platform is located on a loading/unloading area, the loading/unloading area comprises an entrance and a circular loading/unloading path, the operation platform is located on the circular loading/unloading path, the entrance is installed with a monitor, and the monitor communicates with the vehicle entering or exiting the entrance through signals to obtain vehicle identification information, monitor an operation status and position of the vehicle, and send the signals to the central control device.

4. The system for monitoring the tank truck operation platform and for guiding and positioning vehicles according to claim 3, wherein the display device is a signal receiver and display with a display screen and is mounted in a vehicle cab.

5. The system for monitoring the tank truck operation platform and for guiding and positioning vehicles according to claim 4, wherein the signal receiver and display is a cellphone or an on-vehicle display.

6. The system for monitoring the tank truck operation platform and for guiding and positioning vehicles according to claim 3, wherein the display device is a large screen display mounted near the operation platform.

7. The system for monitoring the tank truck operation platform and for guiding and positioning vehicles according to claim 5, wherein a first end of the lifting support is connected to the operation platform for lifting, a second end of the lifting support is connected to an operation terminal, the operation terminal is installed with a vibration sensor, the vibration sensor is used to detect vibration of the operation terminal, and the vibration sensor communicates with the central control device.

8. The system for monitoring the tank truck operation platform and for guiding and positioning vehicles according to claim 7, wherein the central control device is installed inside a controller housing, the controller housing is installed on the operation platform, the remote cloud server is provided with a memory, and the memory is used to store information received by the central control device-.

9. A method of using the system for monitoring the tank truck operation platform and for guiding and positioning vehicles according to claim 4 comprising the following steps:

step 1, monitoring the vehicle at the entrance, and establishing a communication between the monitor and the central control device;

step 2, when the vehicle is approaching the operation platform, establishing a communication between the central control device- and a signal receiver installed on the vehicle, wherein at this time the lifting support is supposed to locate at the upper movement limit, if the lifting support is not at the upper movement limit, the central control device sends a signal to the signal receiver, and the display device issues an alarm to stop the vehicle from entering the operation platform, and if the lifting support is at the upper movement limit, go to step 3;

step 3, positioning the vehicle at the operation platform; measuring, by the distance meter, a distance between a vehicle body and the operation platform; sending, by the central control device, a signal to the display device, if a distance deviation is larger than a predetermined value; and issuing, by the display device, an alarm to remind the driver to move the vehicle to a proper position; if the distance deviation is not larger than the predetermined value, go to step 4;

step 4: controlling, by the driver, the lifting support to move the lifting support to the lower movement limit and lower the lifting support above the vehicle to a roof of the vehicle, and detecting, by the stress sensor, an interaction force between the lifting support and the operation platform; wherein if a value of the interaction force does not fall within a predetermined value range, the lifting support and the operation platform are in a poor connection; the central control device sends a signal to the signal receiver, and the display device issues an alarm to stop the driver to walk onto the lifting support; and if the value of the interaction force falls within the predetermined value range, go to step 5;

step 5: operating a tank of the vehicle by the driver on the operation terminal after the driver walks onto the lifting support; and step 6: after the operation is finished, controlling, by the driver, the lifting support to move the lifting support to the upper movement limit after the driver left the lifting support, moving the vehicle to leave the operation platform and exit from the entrance along the circular loading path, monitoring the vehicle by the monitor, and recording a time of leaving.

10. The method of using the system for monitoring the tank truck operation platform and for guiding and positioning vehicles according to claim 9, wherein the method further comprises a step for alarming according to the vibration of the operation terminal: when the driver left the lifting support and forgot to lift the lifting support, a collision between the operation terminal and the vehicle occurs when the vehicle starts to move, and the vibration of the operation terminal is caused; the vibration sensor sends a signal to the central control device, the central control device sends the signal to the signal receiver, and the display device issues an alarm.

* * * * *